United States Patent
Gallivan

(10) Patent No.: US 7,352,371 B2
(45) Date of Patent: *Apr. 1, 2008

(54) SYSTEM AND METHOD FOR PROVIDING A PERSPECTIVE-CORRECTED REPRESENTATION OF A MULTI-DIMENSIONAL CLUSTER

(75) Inventor: Dan Gallivan, Bainbridge Island, WA (US)

(73) Assignee: Attenex Corporation, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/728,636

(22) Filed: Mar. 26, 2007

(65) Prior Publication Data

US 2007/0182742 A1    Aug. 9, 2007

Related U.S. Application Data

(63) Continuation of application No. 11/110,452, filed on Apr. 19, 2005, now Pat. No. 7,196,705, which is a continuation of application No. 09/944,475, filed on Aug. 31, 2001, now Pat. No. 6,888,548.

(51) Int. Cl.
G06T 11/20 (2006.01)
(52) U.S. Cl. ..................................... 345/440
(58) Field of Classification Search ............... None
See application file for complete search history.

(56) References Cited

U.S. PATENT DOCUMENTS

| | | | |
|---|---|---|---|
| 5,056,021 A | 10/1991 | Ausborn | |
| 5,488,725 A | 1/1996 | Turtle et al. | |
| 5,528,735 A * | 6/1996 | Strasnick et al. | 345/427 |
| 5,619,632 A * | 4/1997 | Lamping et al. | 345/441 |
| 6,137,499 A * | 10/2000 | Tesler | 345/440 |
| 6,173,275 B1 | 1/2001 | Caid et al. | |
| 6,377,287 B1 * | 4/2002 | Hao et al. | 715/853 |
| 6,446,061 B1 | 9/2002 | Doerre et al. | |
| 6,510,406 B1 * | 1/2003 | Marchisio | 704/9 |
| 6,523,026 B1 * | 2/2003 | Gillis | 707/3 |
| 6,560,597 B1 | 5/2003 | Dhillon et al. | |
| 6,628,304 B2 * | 9/2003 | Mitchell et al. | 715/734 |
| 6,675,159 B1 * | 1/2004 | Lin et al. | 707/3 |
| 6,701,305 B1 * | 3/2004 | Holt et al. | 706/45 |
| 6,711,585 B1 | 3/2004 | Copperman et al. | |

OTHER PUBLICATIONS

Jain et al., Data Clustering: A Review, ACM Computing Surveys, vol. 31, No. 3, Sep. 1999.*

(Continued)

*Primary Examiner*—Kee M. Tung
*Assistant Examiner*—Peter-Anthony Pappas
(74) *Attorney, Agent, or Firm*—Patrick J. S. Inouye; Krista A. Wittman

(57) ABSTRACT

A system and method for providing a perspective-corrected representation of a multi-dimensional cluster is presented. Clusters are displayed based on independent spatial orientations within multiple dimensions. For each such spatial orientation, the clusters are located at an independent distance from a common origin. A relationship between a pair of the clusters is picked and analyzed. A criteria for perspective correction is sought. The criteria is applied to the pair of clusters to determine whether the clusters need be reoriented. The clusters are reoriented in the display by a perspective-corrected distance based on the relationship between the pair of clusters.

16 Claims, 16 Drawing Sheets

OTHER PUBLICATIONS

Ozawa. A Stratificational Overlapping Cluster Scheme. Pattern Recogn. vol. 18. 1985.*

Horn, Robert E., "Communication Units, Morphology, and Syntax," *Visual Language: Global Communication for the 21st Century*, 1998, Ch. 3, MacroVU Press, Bainbridge Island, Washington.

Hiroyuki Kawano, "Overview of Mondou Web Search Engine Using Text Mining And Information Visualizing Technologies," IEEE, 2001, pp. 234-241.

James Osborn et al "JUSTICE: A Judicial Search Tool Using Intelligent Concept Extraction," ICAIL-99, 1999, pp. 173-181, ACM.

Chen An et al "Fuzzy Concept Graph And Application In Web Document Clustering," 2001, pp. 101-106, IEEE.

* cited by examiner

110

120

Fig. 10 (con'd).
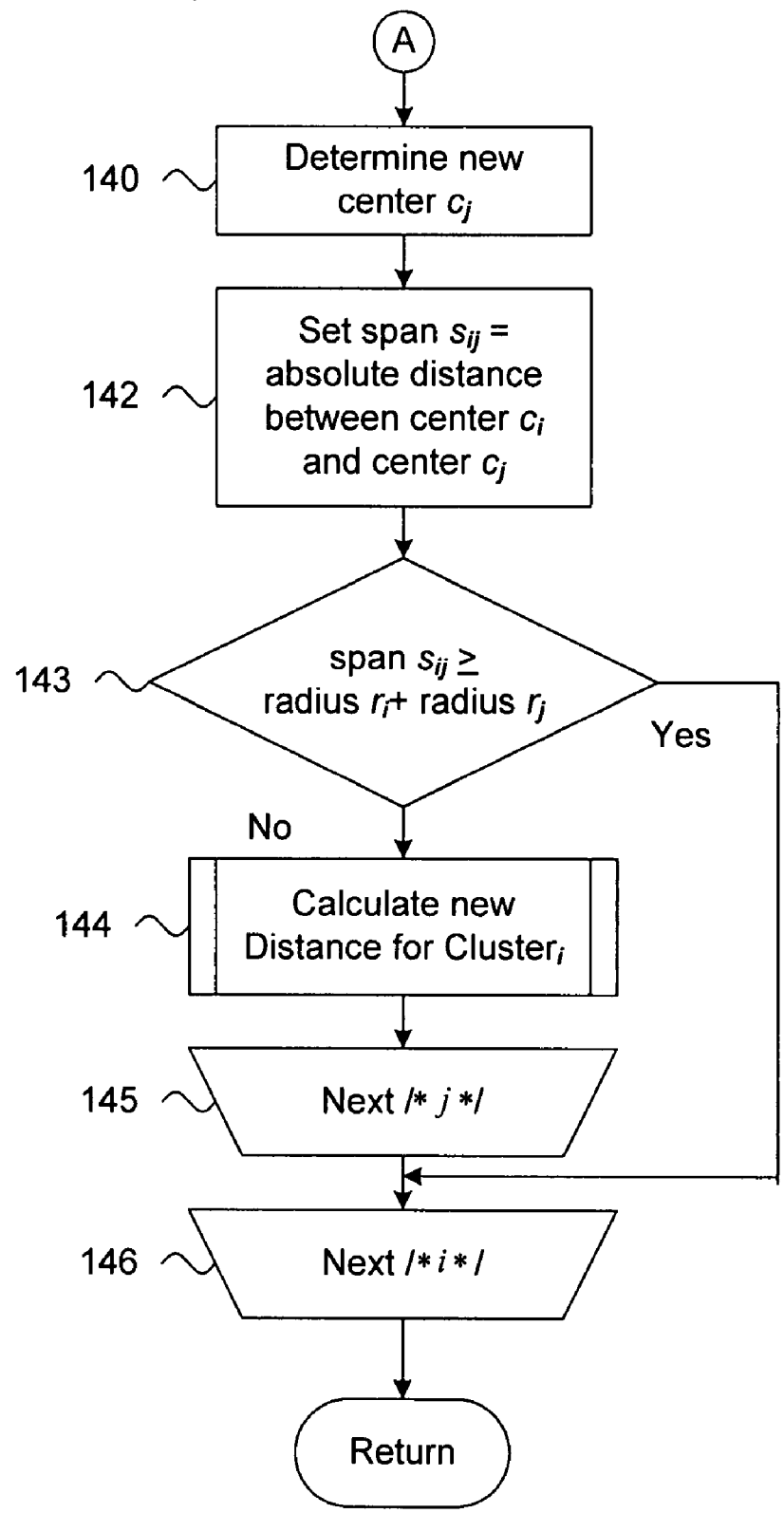

SYSTEM AND METHOD FOR PROVIDING A PERSPECTIVE-CORRECTED REPRESENTATION OF A MULTI-DIMENSIONAL CLUSTER

CROSS-REFERENCE TO RELATED APPLICATION

This patent application is a continuation of commonly-assigned U.S. patent application, Ser. No. 11/110,452, filed Apr. 19, 2005, now U.S. Pat. No. 7,196,705; which is a continuation of U.S. applaction Ser. No. 09/944,475 filed Aug. 31, 2001 now U.S. Pat. No. 6,888,548, issued May 3, 2005, the priority date of which is claimed and the disclosure of which is incorporated by reference.

FIELD OF THE INVENTION

The present invention relates in general to data visualization and, in particular, to a system and method for generating a visualized data representation preserving independent variable geometric relationships.

BACKGROUND OF THE INVENTION

Computer-based data visualization involves the generation and presentation of idealized data on a physical output device, such as a cathode ray tube (CRT), liquid crystal diode (LCD) display, printer and the like. Computer systems visualize data through the use of graphical user interfaces (GUIs) which allow intuitive user interaction and high quality presentation of synthesized information.

The importance of effective data visualization has grown in step with advances in computational resources. Faster processors and larger memory sizes have enabled the application of complex visualization techniques to operate in multi-dimensional concept space. As well, the interconnectivity provided by networks, including intranetworks and internetworks, such as the Internet, enable the communication of large volumes of information to a wide-ranging audience. Effective data visualization techniques are needed to interpret information and model content interpretation.

The use of a visualization language can enhance the effectiveness of data visualization by communicating words, images and shapes as a single, integrated unit. Visualization languages help bridge the gap between the natural perception of a physical environment and the artificial modeling of information within the constraints of a computer system. As raw information cannot always be digested as written words, data visualization attempts to complement and, in some instances, supplant the written word for a more intuitive visual presentation drawing on natural cognitive skills.

Effective data visualization is constrained by the physical limits of computer display systems. Two-dimensional and three-dimensional information can be readily displayed. However, n-dimensional information in excess of three dimensions must be artificially compressed. Careful use of color, shape and temporal attributes can simulate multiple dimensions, but comprehension and usability become difficult as additional layers of modeling are artificially grafted into the finite bounds of display capabilities.

Thus, mapping multi-dimensional information into a two- or three-dimensional space presents a problem. Physical displays are practically limited to three dimensions. Compressing multi-dimensional information into three dimensions can mislead, for instance, the viewer through an erroneous interpretation of spatial relationships between individual display objects. Other factors further complicate the interpretation and perception of visualized data, based on the Gestalt principles of proximity, similarity, closed region, connectedness, good continuation, and closure, such as described in R. E. Horn, "Visual Language: Global Communication for the 21$^{st}$ Century," Ch. 3, MacroVU Press (1998), the disclosure of which is incorporated by reference.

In particular, the misperception of visualized data can cause a misinterpretation of, for instance, dependent variables as independent and independent variables as dependent. This type of problem occurs, for example, when visualizing clustered data, which presents discrete groupings of data which are misperceived as being overlaid or overlapping due to the spatial limitations of a three-dimensional space.

Consider, for example, a group of clusters, each cluster visualized in the form of a circle defining a center and a fixed radius. Each cluster is located some distance from a common origin along a vector measured at a fixed angle from a common axis through the common origin. The radii and distances are independent variables relative to the other clusters and the radius is an independent variable relative to the common origin. In this example, each cluster represents a grouping of points corresponding to objects sharing a common set of traits. The radius of the cluster reflects the relative number of objects contained in the grouping. Clusters located along the same vector are similar in theme as are those clusters located on vectors having a small cosine rotation from each other. Thus, the angle relative to a common axis' distance from a common origin is an independent variable with a correlation between the distance and angle reflecting relative similarity of theme. Each radius is an independent variable representative of volume. When displayed the overlaying or overlapping of clusters could mislead the viewer into perceiving data dependencies where there are none.

Therefore, there is a need for an approach to presenting arbitrarily dimensioned data in a finite-dimensioned display space while preserving independent data relationships. Preferably, such an approach would maintain size and placement relationships relative to a common identified reference point.

There is a further need for an approach to reorienting data clusters to properly visualize independent and dependent variables while preserving cluster radii and relative angles from a common axis drawn through a common origin.

SUMMARY OF THE INVENTION

The present invention provides a system and method for reorienting a data representation containing clusters while preserving independent variable geometric relationships. Each cluster is located along a vector defined at an angle $\theta$ from a common axis x. Each cluster has a radius r. The distance (magnitude) of the center $c_i$ of each cluster from a common origin and the radius r are independent variables relative to other clusters and the radius r of each cluster is an independent variable relative to the common origin. The clusters are selected in order of relative distance from the common origin and optionally checked for an overlap of bounding regions. Clusters having no overlapping regions are skipped. If the pair-wise span $s_{ij}$ between the centers $c_i$ and $c_j$ of the clusters is less than the sum of the radii $r_i$ and $r_j$, a new distance $d_i$ for the cluster is determined by setting the pair-wise span $s_{ij}$ equal to the sum of the radii $r_i$ and $r_j$ and solving the resulting quadratic equation for distance $d_i$. The operations are repeated for each pairing of clusters.

An embodiment is a system and method for reorienting a cluster rendering within a display. A plurality of clusters that have been visually rendered on a two-dimensional display are obtained to model independent spatial orientations within multiple dimensions. The spatial orientations of the clusters in each such dimension are evaluated by identifying two-dimensional relationships for pairs of the clusters. A distance for at least one such cluster is determined from a common origin within the display that visually preserves the spatial orientation of the at least one cluster as a function of the relationships of that cluster.

A further embodiment is a system and method for providing a perspective-corrected representation of a multi-dimensional cluster. Clusters are displayed based on independent spatial orientations within multiple dimensions. For each such spatial orientation, the clusters are located at an independent distance from a common origin. A relationship between a pair of the clusters is picked and analyzed. A criteria for perspective correction is sought. The criteria is applied to the pair of clusters to determine whether the clusters need be reoriented. The clusters are reoriented in the display by a perspective-corrected distance based on the relationship between the pair of clusters.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Figure 1:
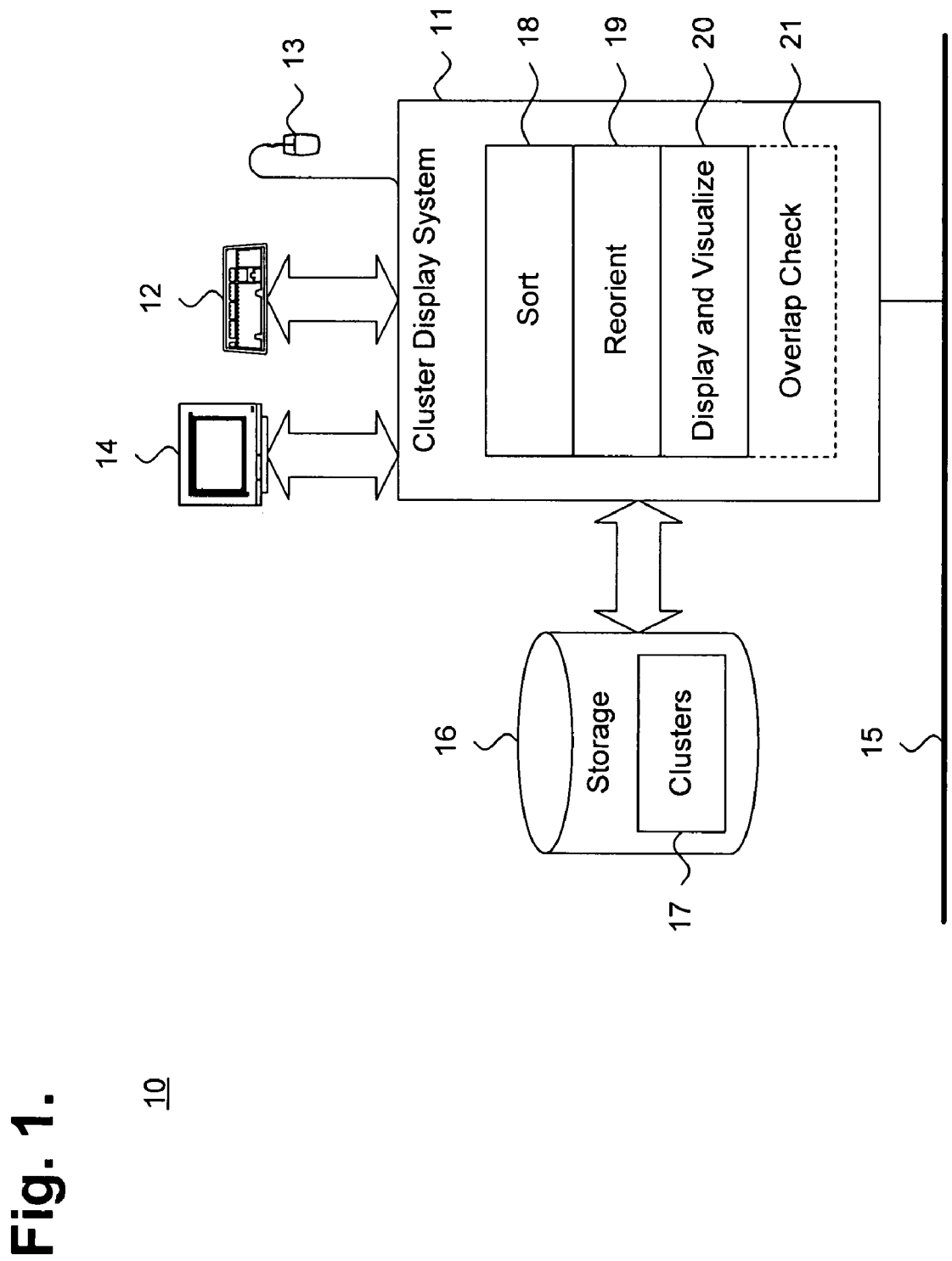
FIG. 1 is a block diagram showing a system for generating a visualized data representation preserving independent variable geometric relationships, in accordance with the present invention.

FIG. 1 is a block diagram 10 showing a system for generating a visualized data representation preserving independent variable geometric relationships, in accordance with the present invention. The system consists of a cluster display system 11, such as implemented on a general-purpose programmed digital computer. The cluster display system 11 is coupled to input devices, including a keyboard 12 and a pointing device 13, such as a mouse, and display 14, including a CRT, LCD display, and the like. As well, a printer (not shown) could function as an alternate display device. The cluster display system 11 includes a processor, memory and persistent storage, such as provided by a storage device 16, within which are stored clusters 17 representing visualized multi-dimensional data. The cluster display system 11 can be interconnected to other computer systems, including clients and servers, over a network 15, such as an intranetwork or internetwork, including the Internet, or various combinations and topologies thereof.

Each cluster 17 represents a grouping of one or more points in a virtualized concept space, as further described below beginning with reference to FIG. 2. Preferably, the clusters 17 are stored as structured data sorted into an ordered list in ascending (preferred) or descending order. In the described embodiment, each cluster represents individual concepts and themes categorized based on, for example, Euclidean distances calculated between each pair of concepts and themes and defined within a pre-specified range of variance, such as described in common-assigned U.S. patent application Ser. No. 09/943,918, entitled "System And Method For Efficiently Generating Cluster Groupings In A Multi-Dimensional Concept Space," filed Aug. 31, 2001, pending, the disclosure of which is incorporated by reference.

Figure 12:
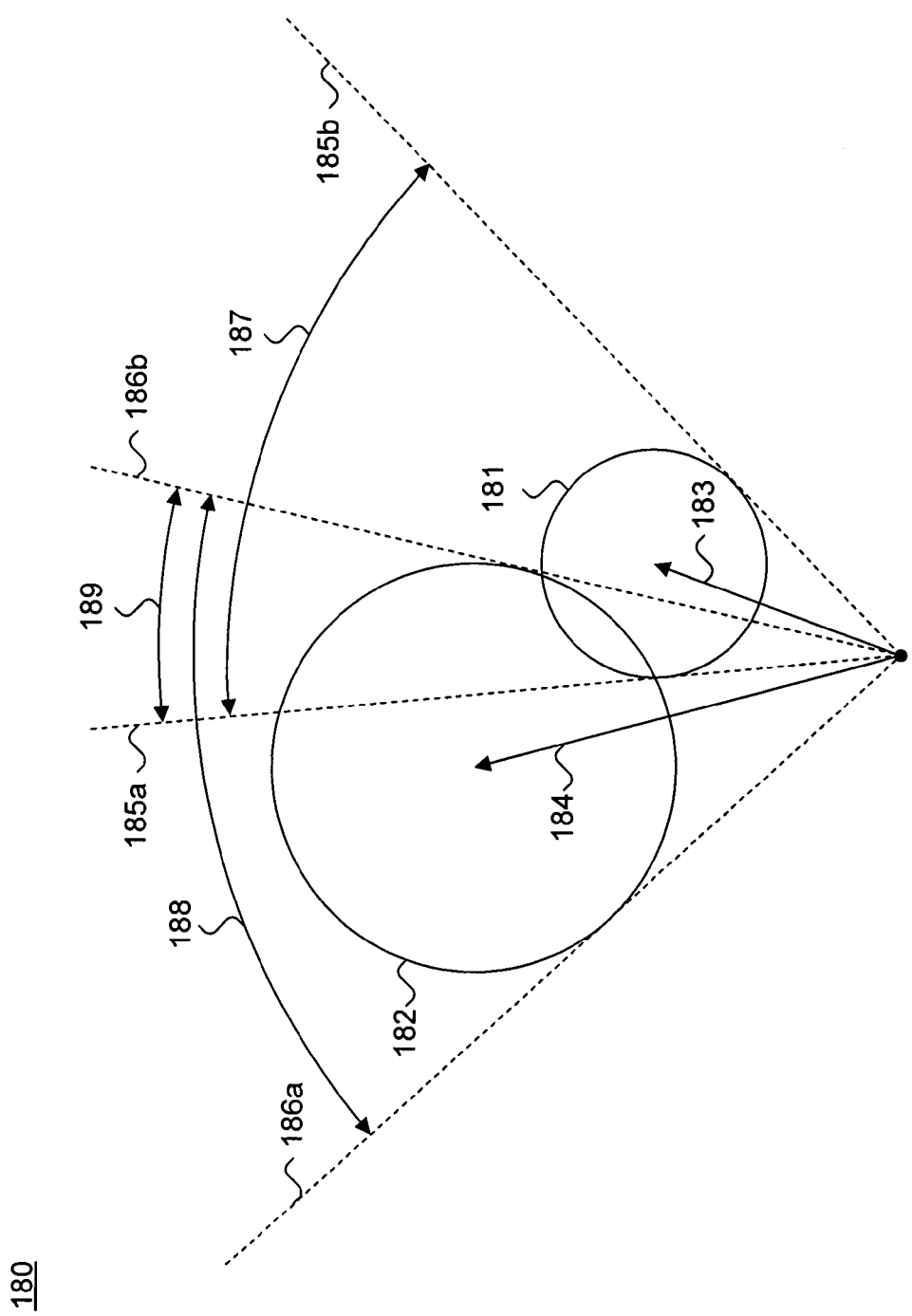
FIG. 12 is a graph showing, by way of example, a pair of clusters with overlapping bounding regions generated by the cluster display system of FIG. 1.

The cluster display system 11 includes four modules: sort 18, reorient 19, display and visualize 20, and, optionally, overlap check 21. The sort module 18 sorts a raw list of clusters 17 into either ascending (preferred) or descending order based on the relative distance of the center of each cluster from a common origin. The reorient module 19, as further described below with reference to FIG. 10, reorients the data representation display of the clusters 17 to preserve the orientation of independent variable relationships. The reorient module 19 logically includes a comparison submodule for measuring and comparing pair-wise spans between the radii of clusters 17, a distance determining submodule for calculating a perspective-corrected distance from a common origin for select clusters 17, and a coefficient submodule taking a ratio of perspective-corrected distances to original distances. The display and visualize module 20 performs the actual display of the clusters 17 via the display 14 responsive to commands from the input devices, including keyboard 12 and pointing device 13. Finally, the overlap check module 21, as further described below with reference to FIG. 12, is optional and, as a further embodiment, provides an optimization whereby clusters 17 having overlapping bounding regions are skipped and not reoriented.

The individual computer systems, including cluster display system 11, are general purpose, programmed digital computing devices consisting of a central processing unit (CPU), random access memory (RAM), non-volatile secondary storage, such as a hard drive or CD ROM drive, network interfaces, and peripheral devices, including user interfacing means, such as a keyboard and display. Program code, including software programs, and data are loaded into the RAM for execution and processing by the CPU and results are generated for display, output, transmittal, or storage.

Each module is a computer program, procedure or module written as source code in a conventional programming language, such as the C++ programming language, and is presented for execution by the CPU as object or byte code, as is known in the art. The various implementations of the source code and object and byte codes can be held on a computer-readable storage medium or embodied on a transmission medium in a carrier wave. The cluster display system 11 operates in accordance with a sequence of process steps, as further described below with reference to FIG. 9.

Figure 2:
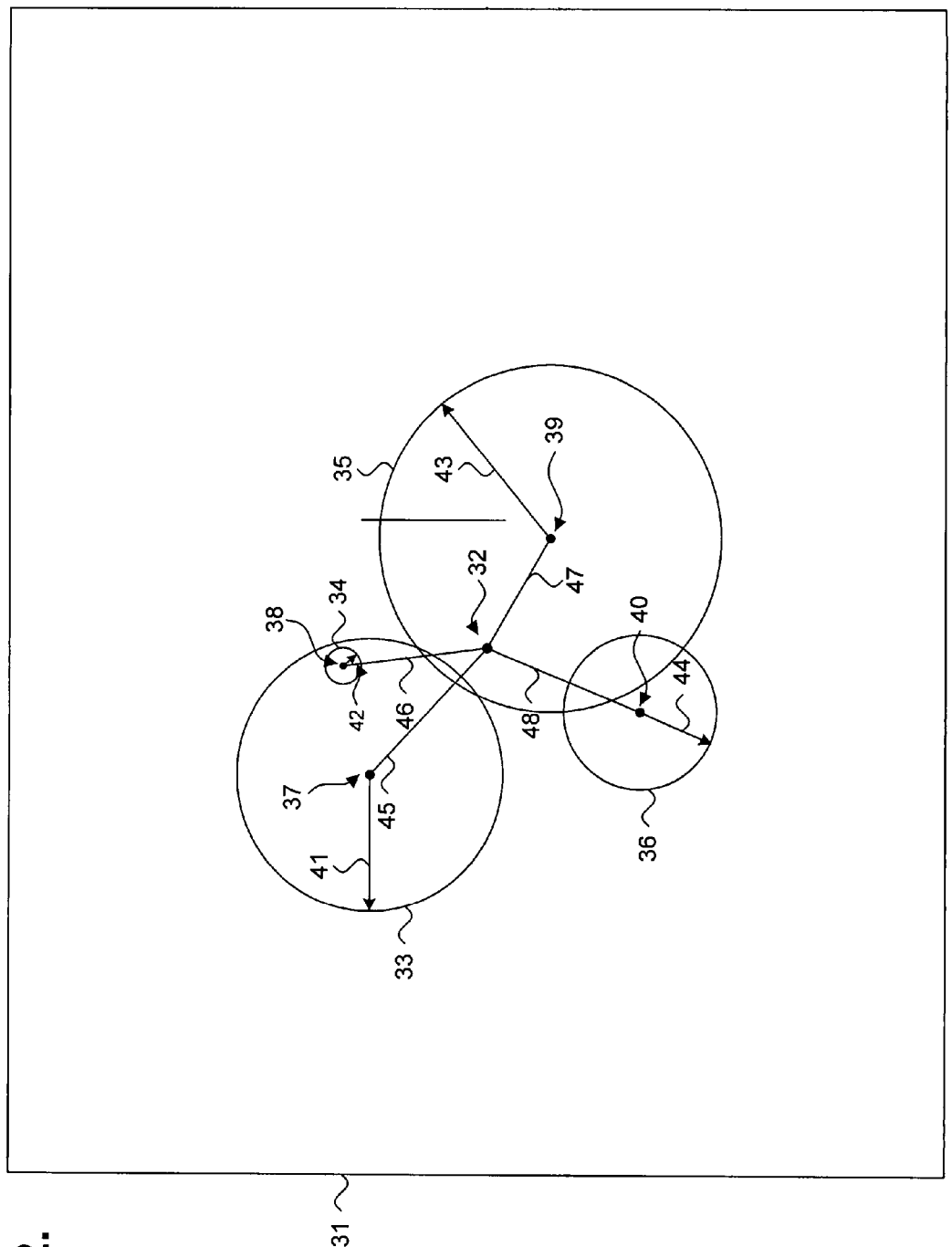
FIG. 2 is a data representation diagram showing, by way of example, a view of overlapping clusters generated by the cluster display system of FIG. 1.

FIG. 2 is a data representation diagram 30 showing, by way of example, a view 31 of overlapping clusters 33-36 generated by the cluster display system 11 of FIG. 1. Each cluster 33-36 has a center c 37-40 and radius r 41-44, respectively, and is oriented around a common origin 32. The center c of each cluster 33-36 is located at a fixed distance (magnitude) d 45-48 from the common origin 32. Cluster 34 overlays cluster 33 and clusters 33, 35 and 36 overlap.

Each cluster 33-36 represents multi-dimensional data modeled in a three-dimensional display space. The data could be visualized data for a virtual semantic concept space, including semantic content extracted from a collection of documents represented by weighted clusters of concepts, such as described in commonly-assigned U.S. patent application Ser. No. 09/944,474, entitled "System And Method For Dynamically Evaluating Latent Concepts In Unstructured Documents," filed Aug. 31, 2001, pending, the disclosure of which is incorporated by reference.

Figure 3:
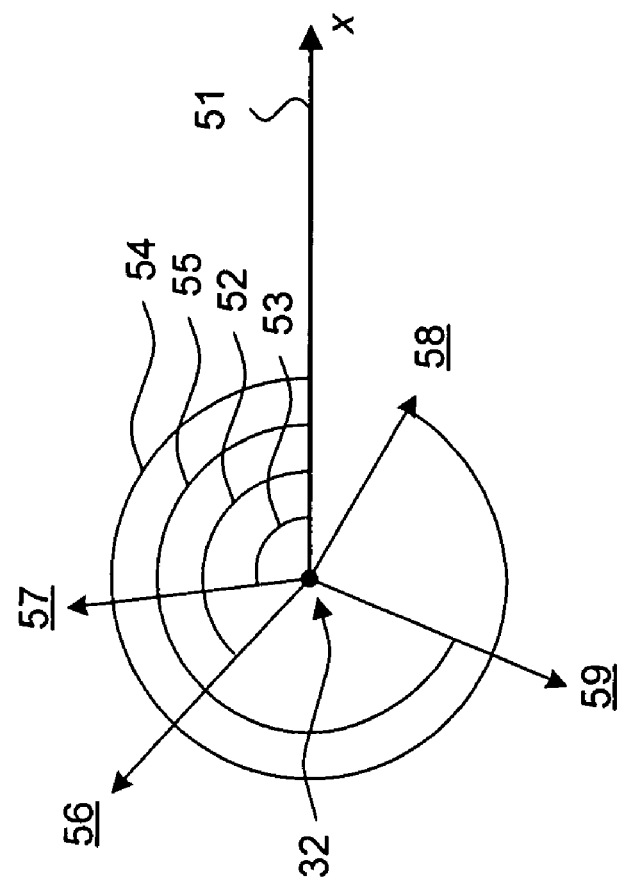
FIG. 3 is a graph showing, by way of example, the polar coordinates of the overlapping clusters of FIG. 2.

FIG. 3 is a graph 50 showing, by way of example, the polar coordinates of the overlapping clusters 33-36 of FIG. 2. Each cluster 33-36 is oriented at a fixed angle θ 52-55 along a common axis x 51 drawn through the common origin 32. The angles θ 52-55 and radii r 41-44 (shown in FIG. 2) of each cluster 33-36, respectively, are independent variables. The distances d 56-59 represent dependent variables.

Referring back to FIG. 2, the radius r 41-44 (shown in FIG. 2) of each cluster 33-36 signifies the number of documents attracted to the cluster. The distance d 56-59 increases as the similarity of concepts represented by each cluster 33-36 decreases. However, based on appearance alone, a viewer can be misled into interpreting cluster 34 as being dependent on cluster 33 due to the overlay of data representations. Similarly, a viewer could be misled to interpret dependent relationships between clusters 33, 35 and 36 due to the overlap between these clusters.

Figure 4:
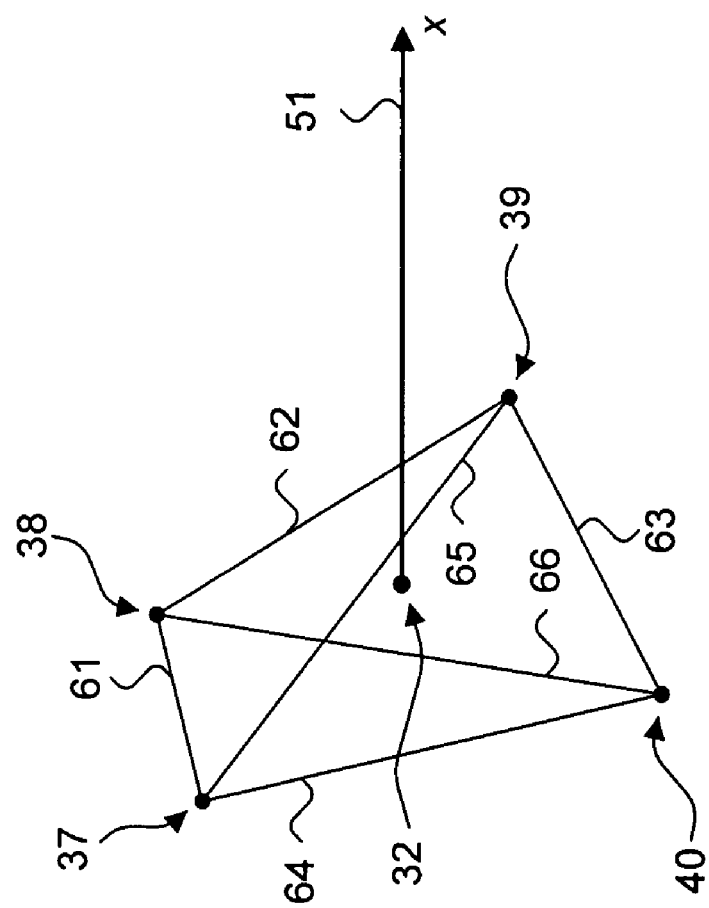
FIG. 4 is a data representation diagram showing, by way of example, the pair-wise spans between the centers of the clusters of FIG. 2.

FIG. 4 is a data representation diagram 60 showing, by way of example, the pair-wise spans between the centers of the clusters of FIG. 2. Centers c 37-40 of the clusters 33-36 (shown in FIG. 2) are separated respectively by pair-wise spans s 61-66. Each span s 61-66 is also dependent on the independent variables radii r 41-44 (shown in FIG. 2) and angles θ 52-55.

For each cluster 33-36 (shown in FIG. 2), the radii r is an independent variable. The distances d 56-59 (shown in FIG. 3) and angles θ 52-55 (shown in FIG. 3) are also independent variables. However, the distances d 56-59 and angles θ 52-55 are correlated, but there is no correlation between different distances d 56-59. As well, the relative angles θ 52-55 are correlated relative to the common axis x, but are not correlated relative to other angles θ 52-55. However, the distances d 56-59 cause the clusters 33-36 to appear to either overlay or overlap and these visual artifacts erroneously imply dependencies between the neighboring clusters based on distances d 56-59.

Figure 5:
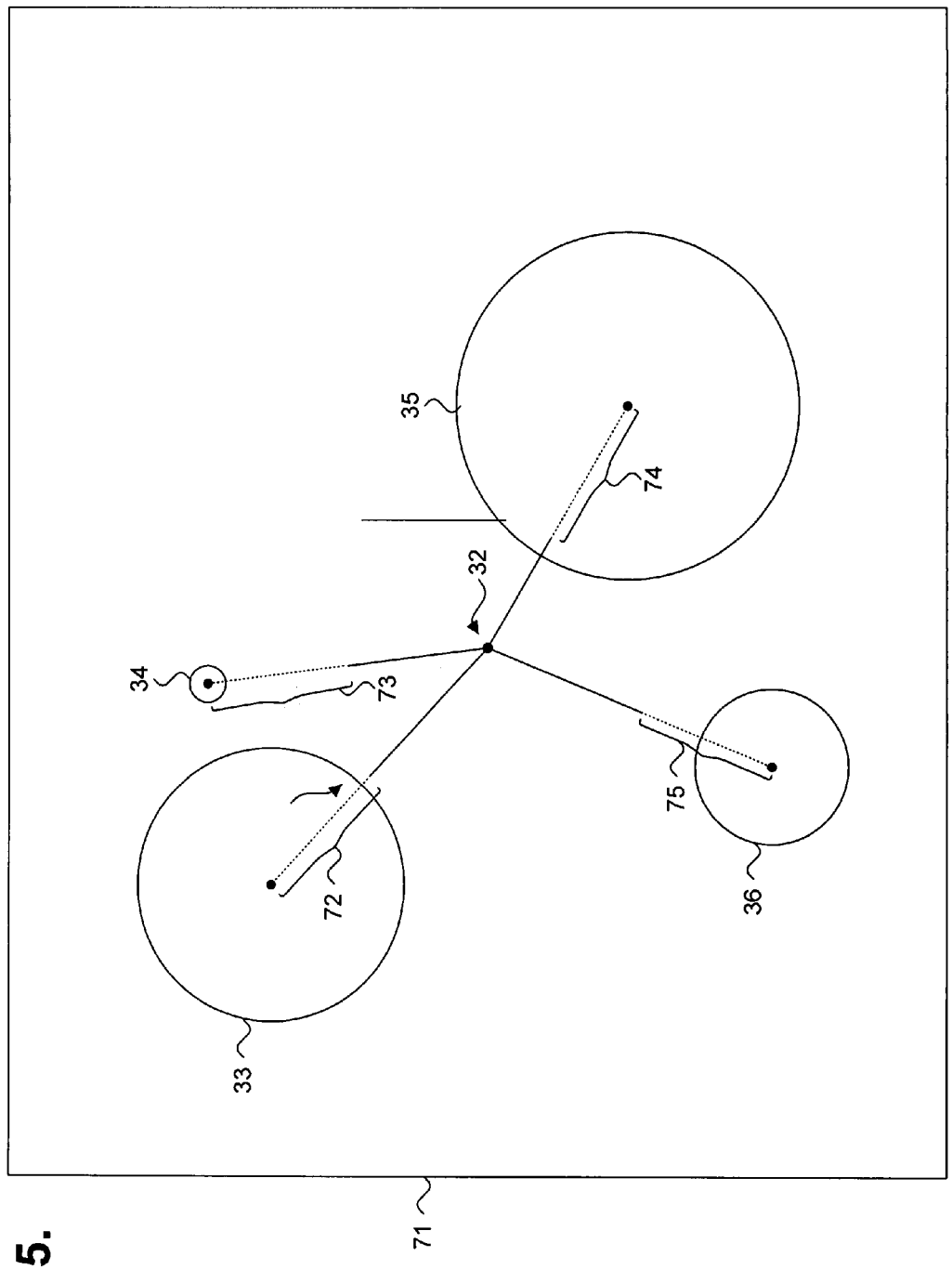
FIG. 5 is a data representation diagram showing, by way of example, an exploded view of the clusters of FIG. 2.

FIG. 5 is a data representation diagram 70 showing, by way of example, an exploded view 71 of the clusters 33-36 of FIG. 2. To preserve the relationships between the dependent variables distance d and span s, the individual distances d 56-59 (shown in FIG. 3) are multiplied by a fixed coefficient to provide a proportionate extension e 71-75, respectively, to each of the distances d 56-59. The resulting data visualization view 71 "explodes" clusters 33-36 while preserving the independent relationships of the radii r 41-44 (shown in FIG. 2) and angles θ 52-55 (shown in FIG. 3).

Although the "exploded" data visualization view 71 preserves the relative pair-wise spans s 61-66 between each of the clusters 33-36, multiplying each distance d 56-59 by the same coefficient can result in a potentially distributed data representation requiring a large display space.

Figure 6:
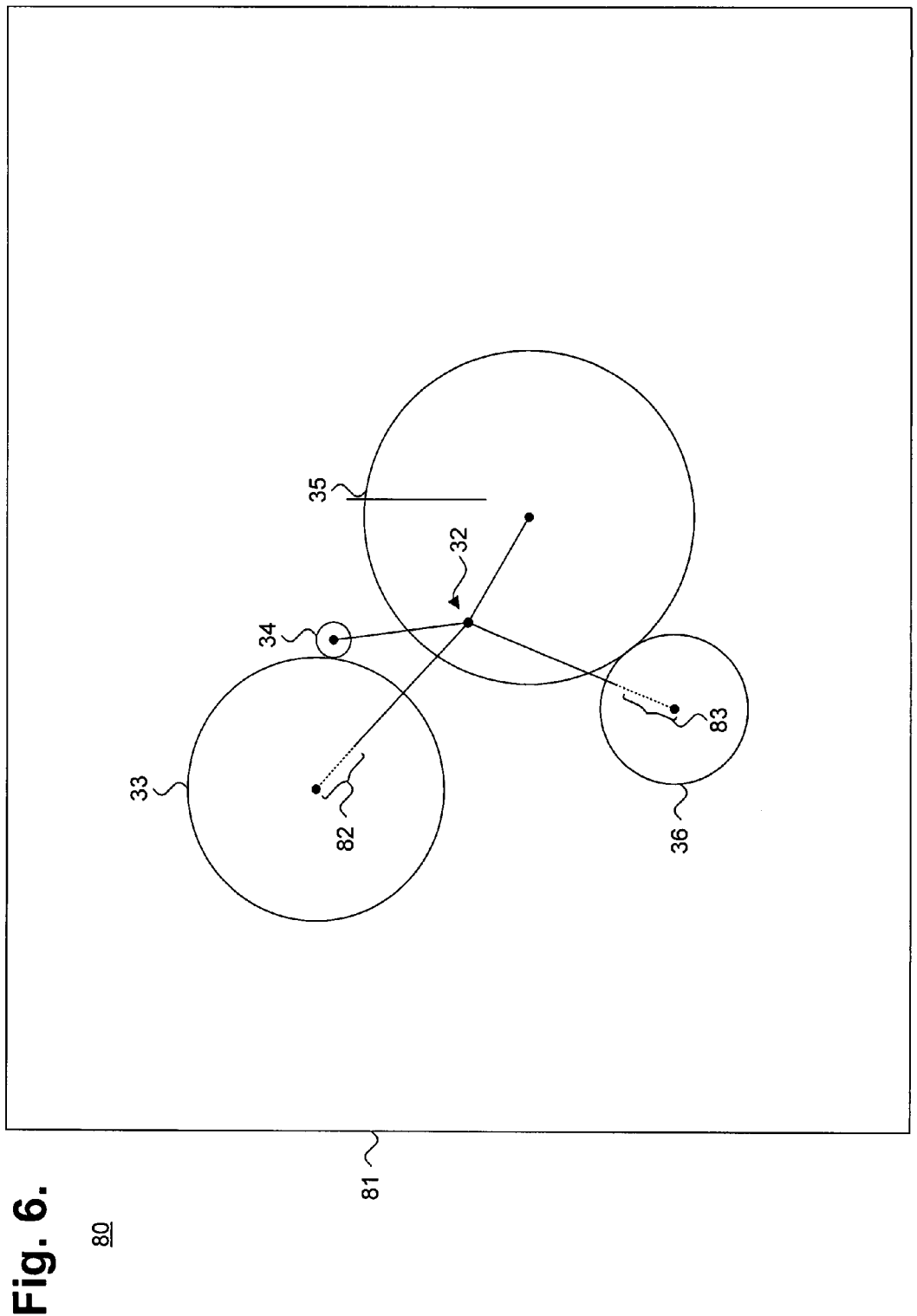
FIG. 6 is a data representation diagram showing, by way of example, a minimized view of the clusters of FIG. 2.

FIG. 6 is a data representation diagram 80 showing, by way of example, a minimized view 81 of the clusters 33-36 of FIG. 2. As in the exploded view 71 (shown in FIG. 5), the radii r 41-44 (shown in FIG. 2) and angles θ 52-55 (shown in FIG. 3) of each cluster 33-36 are preserved as independent variables. The distances d 56-59 are independent variables, but are adjusted to correct to visualization. The "minimized" data representation view 81 multiplies distances d 45 and 48 (shown in FIG. 2) by a variable coefficient k. Distances d 46 and 47 remain unchanged, as the clusters 34 and 35, respectively, need not be reoriented. Accordingly, the distances d 45 and 48 are increased by extensions e' 82 and 83, respectively, to new distances d'.

Figure 7:
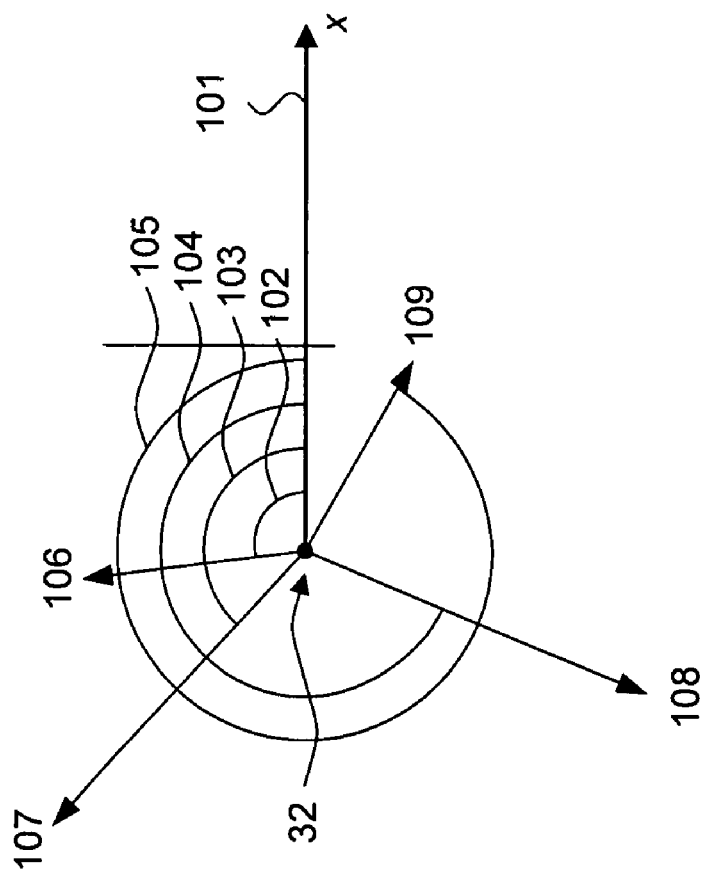
FIG. 7 is a graph, showing, by way of example, the polar coordinates of the minimized clusters of FIG. 5.

FIG. 7 is a graph 90 showing, by way of example, the polar coordinates of the minimized clusters 33-36 of FIG. 5. Although the clusters 33-36 have been shifted to distances d' 106-109 from the common origin 32, the radii r 41-44 (shown in FIG. 2) and angles θ 102-105 relative to the shared axis x 101 are preserved. The new distances d' 106-109 also approximate the proportionate pair-wise spans s' 110-115 between the centers c 37-40.

Figure 8:
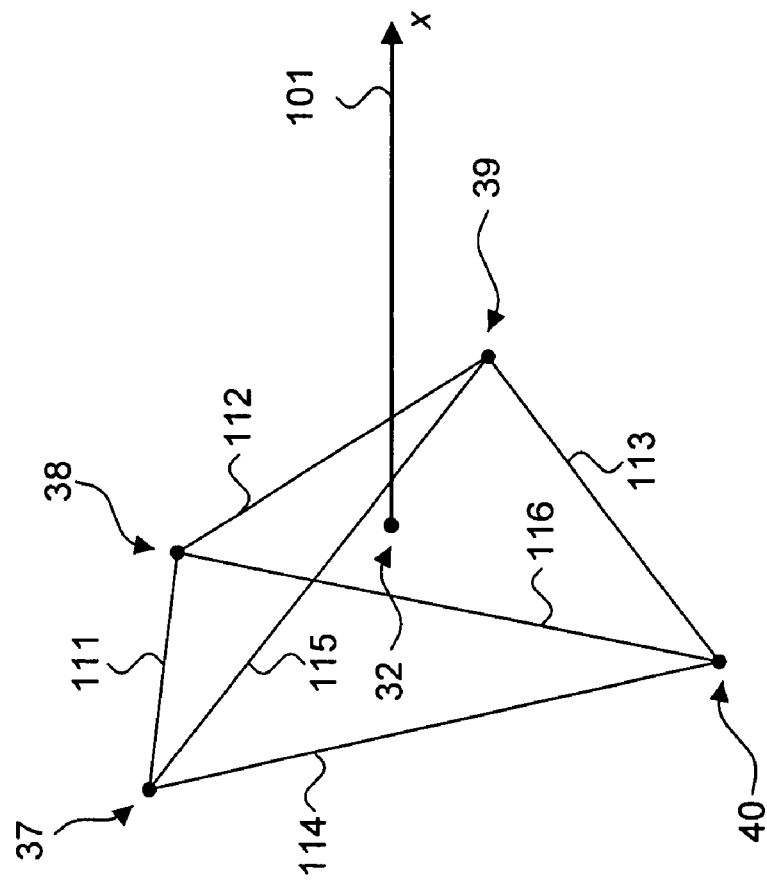
FIG. 8 is a data representation diagram showing, by way of example, the pair-wise spans between the centers of the clusters of FIG. 2.

FIG. 8 is a data representation diagram 110 showing, by way of example, the pair-wise spans between the centers of the clusters of FIG. 2. Centers c 37-40 (shown in FIG. 2) of the clusters 33-36 are separated respectively by pair-wise spans s 111-116. Each span s 111-116 is dependent on the independent variables radii r 41-44 and the angles θ 52-55 (shown in FIG. 3). The length of each pair-wise span s 111-116 is proportionately increased relative to the increase in distance d 56-69 of the centers c 37-40 of the clusters 33-36 from the origin 32.

Figure 9:
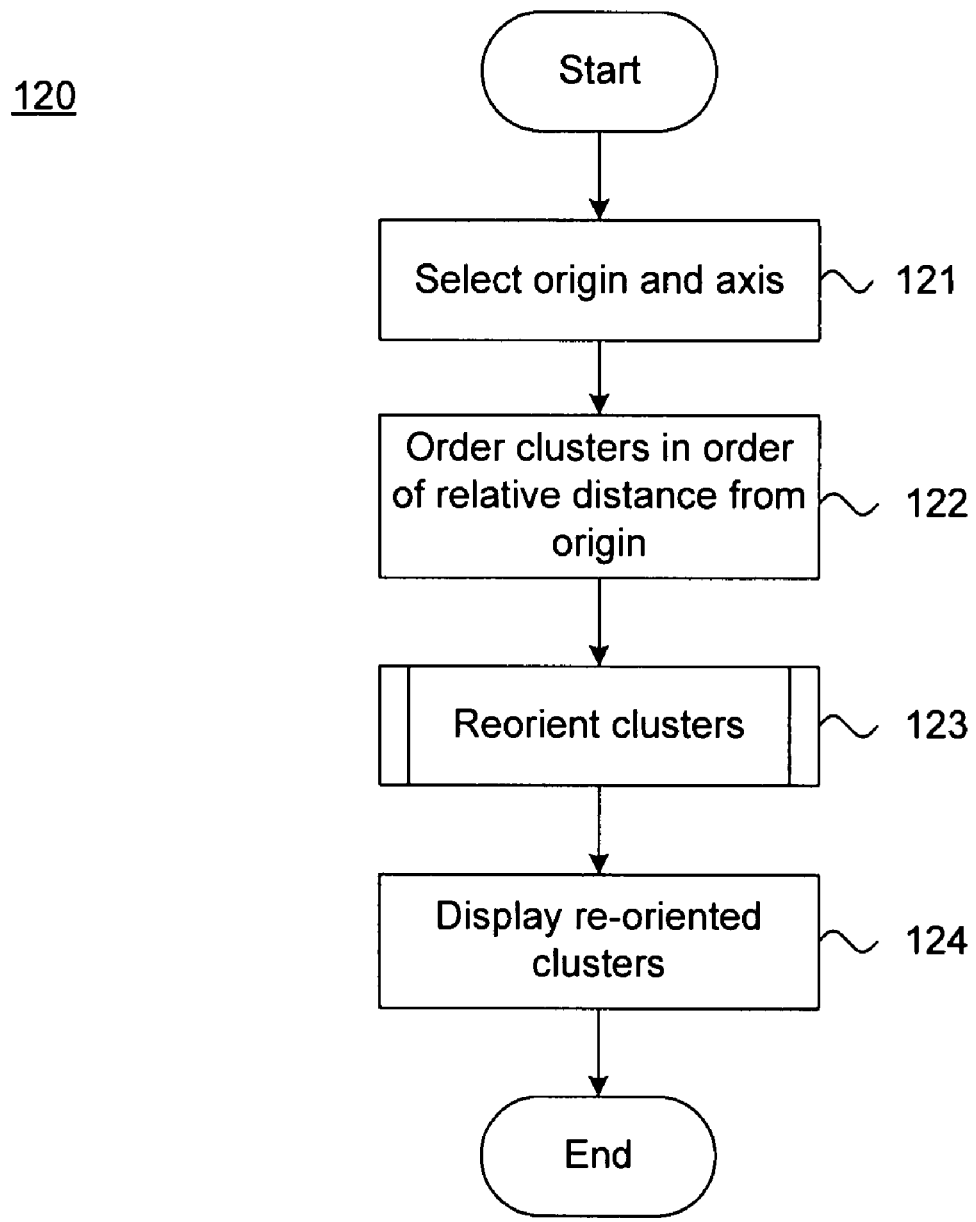
FIG. 9 is a flow diagram showing a method for generating a visualized data representation preserving independent variable geometric relationships, in accordance with the present invention.

FIG. 9 is a flow diagram showing a method 120 for generating a visualized data representation preserving independent variable geometric relationships, in accordance with the present invention. As a preliminary step, the origin 32 (shown in FIG. 2) and x-axis 51 (shown in FIG. 3) are selected (block 121). Although described herein with reference to polar coordinates, any other coordinate system could also be used, including Cartesian, Logarithmic, and others, as would be recognized by one skilled in the art.

Next, the clusters 17 (shown in FIG. 1) are sorted in order of relative distance d from the origin 32 (block 122). Preferably, the clusters 17 are ordered in ascending order, although descending order could also be used. The clusters 17 are reoriented (block 123), as further described below with reference to FIG. 10. Finally, the reoriented clusters 17 are displayed (block 124), after which the routine terminates.

Figure 10:
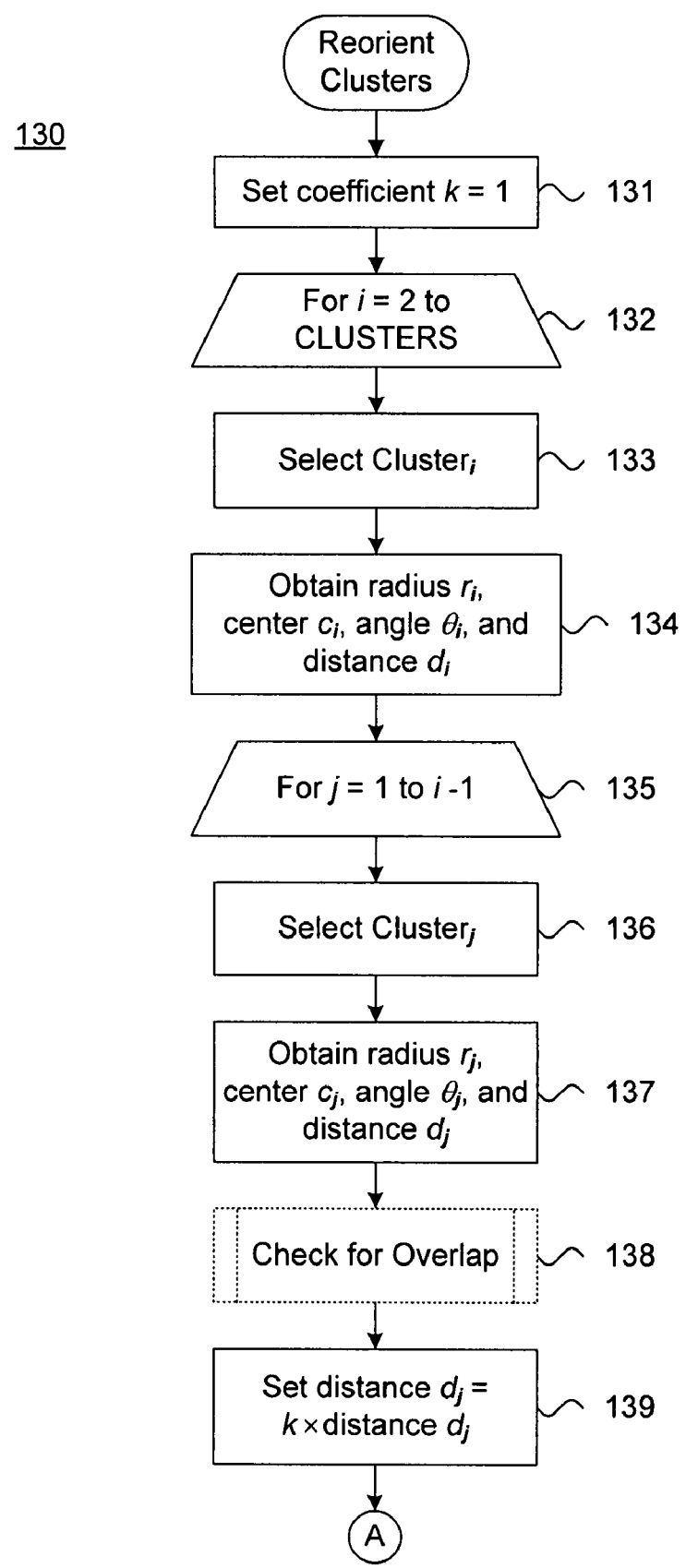
FIG. 10 is a routine for reorienting clusters for use in the method of FIG. 9.

FIG. 10 is a flow diagram showing a routine 130 for reorienting clusters 17 for use in the method 120 of FIG. 9. The purpose of this routine is to generate a minimized data representation, such as described above with reference to FIG. 5, preserving the orientation of the independent variables for radii r and angles θ relative to a common x-axis.

Initially, a coefficient k is set to equal 1 (block 131). During cluster reorientation, the relative distances d of the centers c of each cluster 17 from the origin 32 is multiplied by the coefficient k The clusters 17 are then processed in a pair of iterative loops as follows. During each iteration of an outer processing loop (blocks 132-146), beginning with the innermost cluster, each cluster 17, except for the first cluster, is selected and processed. During each iteration of the inner processing loop (blocks 135-145), each remaining cluster 17 is selected and reoriented, if necessary.

Thus, during the outer iterative loop (blocks 132-146), an initial Cluster$_i$ is selected (block 133) and the radius r$_i$, center c$_i$, angle θ$_i$, and distance d$_i$ for the selected Cluster$_i$ are obtained (block 134). Next, during the inner iterative loop (blocks 135-145), another Cluster$_j$ (block 136) is selected and the radius r$_j$, center c$_j$, angle θ$_j$, and distance d$_j$ are obtained (block 137).

In a further embodiment, bounding regions are determined for Cluster$_i$ and Cluster$_j$ and the bounding regions are checked for overlap (block 138), as further described below with reference to FIG. 14.

Next, the distance d$_i$ of the cluster being compared, Cluster$_i$, is multiplied by the coefficient k (block 139) to establish an initial new distance d'$_i$ for Cluster$_i$. A new center c$_i$ is determined (block 140). The span s$_{ij}$ between the two clusters, Cluster$_i$ and Cluster$_j$, is set to equal the absolute distance between center c$_i$ plus center c$_j$. If the pair-wise span s$_{ij}$ is less than the sum of radius r$_i$ and radius r$_j$ for Cluster$_i$ and Cluster$_j$, respectively (block 143), a new distance d$_i$ for Cluster$_i$ is calculated (block 144), as further described below with reference to FIG. 11. Processing of each additional Cluster$_i$ continues (block 145) until all additional clusters have been processed (blocks 135-145). Similarly, processing of each Cluster$_j$ (block 146) continues until all clusters have been processed (blocks 132-146), after which the routine returns.

Figure 11:
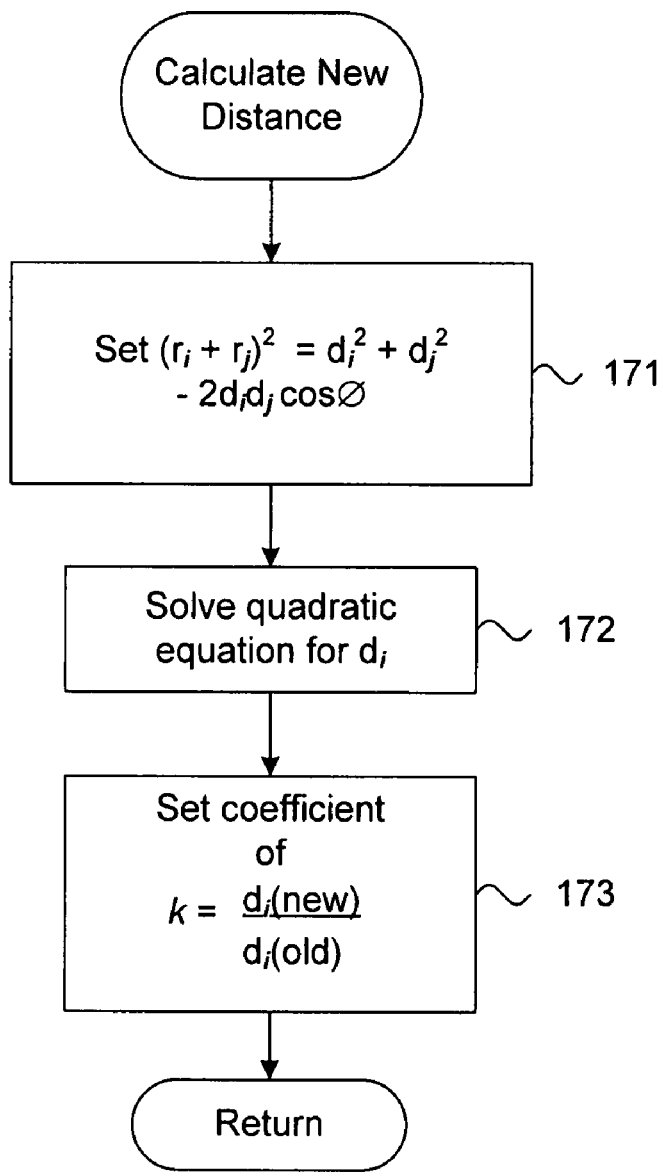
FIG. 11 is a flow diagram showing a routine for calculating a new distance for use in the routine of FIG. 10.

FIG. 11 is a flow diagram showing a routine 170 for calculating a new distance for use in the routine 130 of FIG. 10. The purpose of this routine is to determine a new distance d'$_i$ for the center c$_i$ of a selected cluster$_i$ from a common origin. In the described embodiment, the new distance d'$_i$ is determined by solving the quadratic equation formed by the distances d$_i$ and d$_j$ and adjacent angle.

Thus, the sum of the radii $(r_i+r_j)^2$ is set to equal the square of the distance d$_j$ plus the square of the distance d$_i$ minus the product of the 2 times the distance d$_j$ times the distance d$_i$ times cos θ (block 171), as expressed by equation (1):

$$(r_i+r_j)^2 = d_i^2 + d_j^2 - 2 \cdot d_i d_j \cos\theta \qquad (1)$$

The distance d$_i$ can be calculated by solving a quadratic equation (5) (block 172), derived from equation (1) as follows:

$$1 \cdot d_i^2 + (2 \cdot d_j \cos\theta) d_i = (d_j^2 - [r_i + r_j]^2) \qquad (2)$$

$$1 \cdot d_i^2 + (2 \cdot d_j \cos\theta) d_i - (d_j^2 - [r_i + r_j]^2) = 0 \qquad (3)$$

$$d_i = \frac{(2 \cdot d_j \cos\theta) \pm \sqrt{(2 \cdot d_j \cos\theta)^2 - 4 \cdot 1 \cdot (d_j^2 - [r_i + r_j]^2)}}{2 \cdot 1} \qquad (4)$$

$$d_i = \frac{(2 \cdot d_j \cos\theta) \pm \sqrt{(2 \cdot d_j \cos\theta)^2 - 4 \cdot (d_j^2 - [r_i + r_j]^2)}}{2} \qquad (5)$$

In the described embodiment, the '±' operation is simplified to a '+' operation, as the distance d$_i$ is always increased.

Finally, the coefficient k, used for determining the relative distances d from the centers c of each cluster 17 (block 139 in FIG. 10), is determined by taking the product of the new distance d$_i$ divided by the old distance d$_i$ (block 173), as expressed by equation (6):

$$k = \frac{d_{i_{new}}}{d_{i_{old}}} \qquad (6)$$

The routine then returns.

In a further embodiment, the coefficient k is set to equal 1 if there is no overlap between any clusters, as expressed by equation (7):

$$\text{if } \frac{d_{i-1} + r_{i-1}}{d_i - r_i} > 1, \text{ then } k = 1 \qquad (7)$$

where d$_i$ and d$_{i-1}$ are the distances from the common origin and r$_i$ and r$_{i-1}$ are the radii of clusters i and i-1, respectively. If the ratio of the sum of the distance plus the radius of the further cluster i-1 over the difference of the distance less the radius of the closer cluster i is greater than 1, the two clusters do not overlap and the distance d$_i$ of the further cluster need not be adjusted.

FIG. 12 is a graph showing, by way of example, a pair of clusters 181-182 with overlapping bounding regions generated by the cluster display system 11 of FIG. 1. The pair of clusters 181-182 are respectively located at distances d 183-184 from a common origin 180. A bounding region 187 for cluster 181 is formed by taking a pair of tangent vectors 185a-b from the common origin 180. Similarly, a bounding region 188 for cluster 182 is formed by taking a pair of tangent vectors 186a-b from the common origin 180. The intersection 189 of the bounding regions 187-188 indicates that the clusters 181-182 might either overlap or overlay and reorientation may be required.

Figure 13:
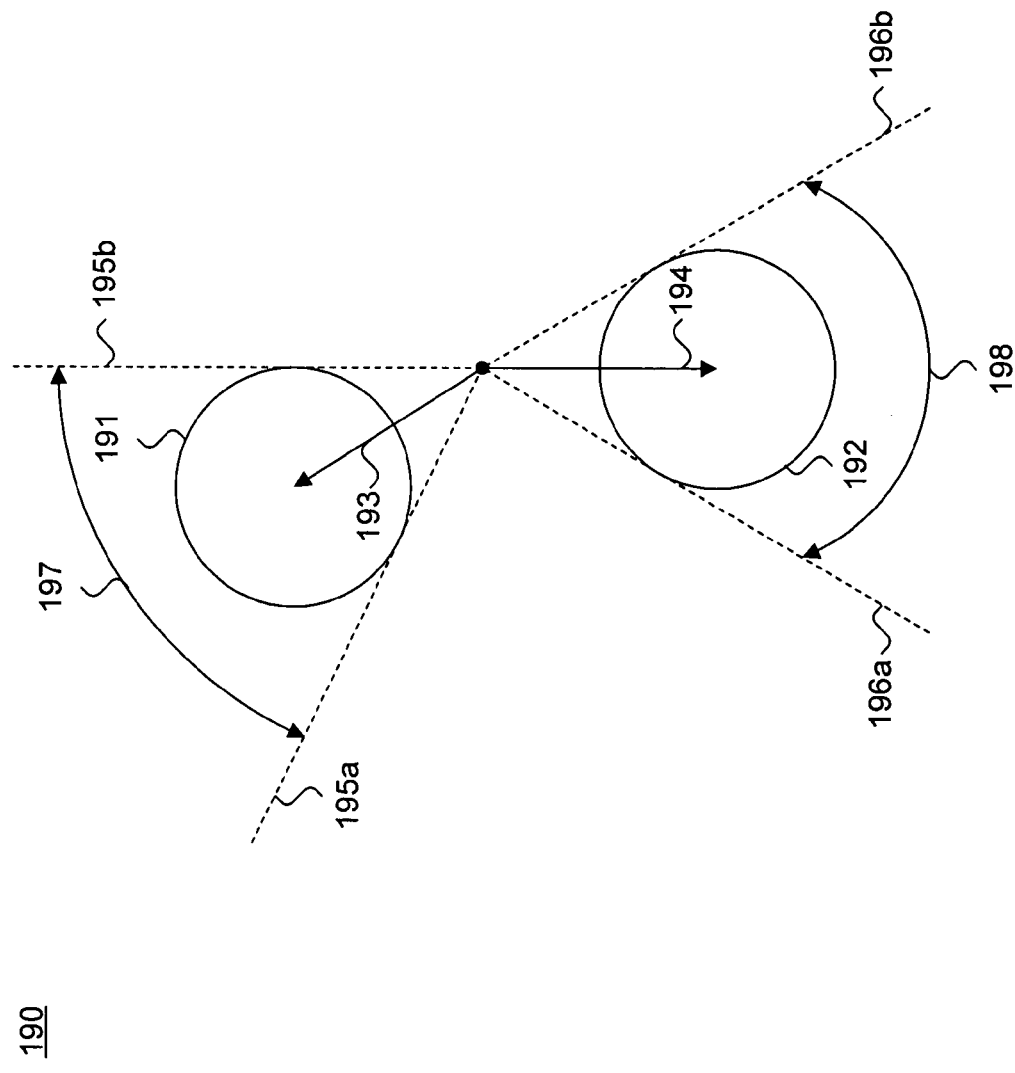
FIG. 13 is a graph showing, by way of example, a pair of clusters with non-overlapping bounding regions generated by the cluster display system of FIG. 1.

FIG. 13 is a graph showing, by way of example, a pair of clusters 191-192 with non-overlapping bounding regions generated by the cluster display system 11 of FIG. 1. The pair of clusters 191-192 are respectively located at distances d 193-194 from a common origin 190. A bounding region 197 for cluster 191 is formed by taking a pair of tangent vectors 195a-b from the common origin 190. Similarly, a bounding region 198 for cluster 192 is formed by taking a pair of tangent vectors 196a-b from the common origin 190. As the bounding regions 197-198 do not intersect, the clusters 191-192 are non-overlapping and non-overlaid and therefore need not be reoriented.

Figure 14:
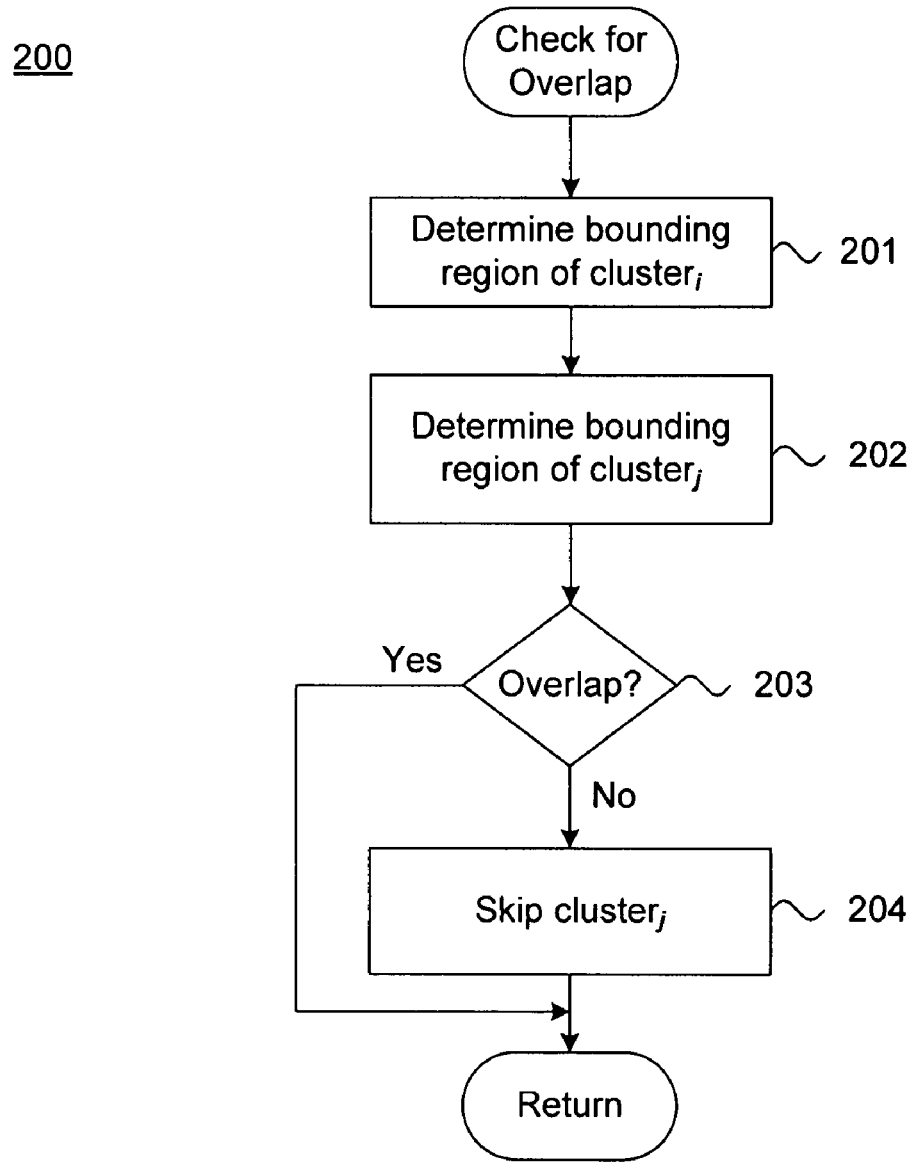
FIG. 14 is a routine for checking for overlapping clusters for use in the routine of FIG. 10.

FIG. 14 is a flow diagram showing a routine 200 for checking for overlap of bounding regions for use in the routine 130 of FIG. 10. As described herein, the terms overlap and overlay are simply referred to as "overlapping." The purpose of this routine is to identify clusters 17 (shown in FIG. 1) that need not be reoriented due to the non-overlap of their respective bounding regions. The routine 200 is implemented as an overlap submodule in the reorient module 19 (shown in FIG. 1).

Thus, the bounding region of a first Cluster$_i$ is determined (block 201) and the bounding region of a second Cluster$_j$ is determined (block 202). If the respective bounding regions do not overlap (block 203), the second Cluster$_j$ is skipped (block 204) and not reoriented. The routine then returns.

Figure 15:
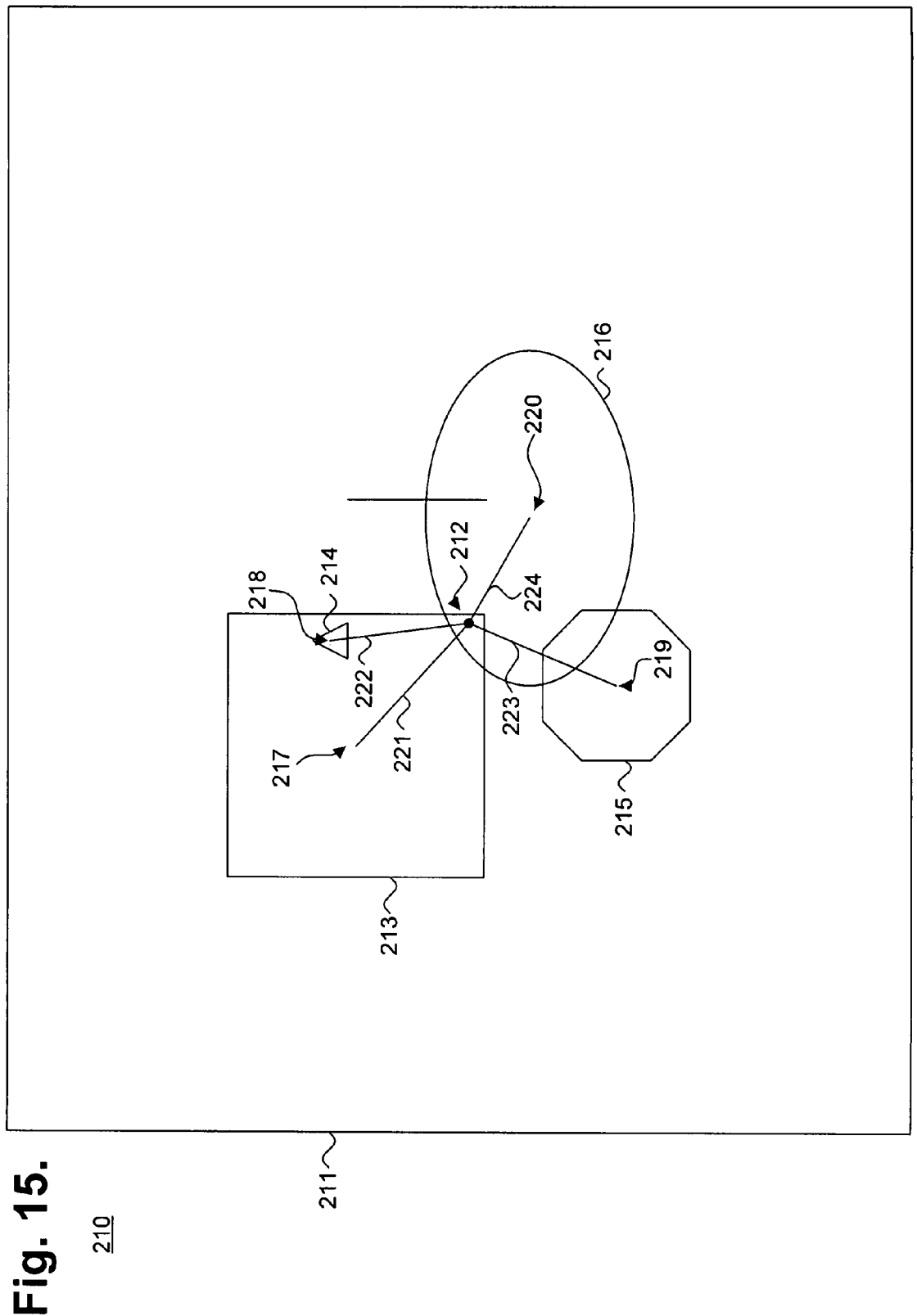
FIG. 15 is a data representation diagram showing, by way of example, a view of overlapping, non-circular clusters generated by the clustered display system of FIG. 1.

FIG. 15 is a data representation diagram 210 showing, by way of example, a view 211 of overlapping non-circular cluster 213-216 generated by the clustered display system 11 of FIG. 1. Each cluster 213-216 has a center of mass $c_m$ 217-220 and is oriented around a common origin 212. The center of mass as $c_m$ of each cluster 213-216 is located at a fixed distance d 221-224 from the common origin 212. Cluster 218 overlays cluster 213 and clusters 213, 215 and 216 overlap.

As described above, with reference to FIG. 2, each cluster 213-216 represents multi-dimensional data modeled in a three-dimension display space. Furthermore, each of the clusters 213-216 is non-circular and defines a convex volume representing a data grouping located within the multi-dimensional concept space. The center of mass $c_m$ at 217-220 for each cluster 213-216, is logically located within the convex volume. The segment measured between the point closest to each other cluster along a span drawn between each pair of clusters is calculable by dimensional geometric equations, as would be recognized by one skilled in the art. By way of example, the clusters 213-216 represent non-circular shapes that are convex and respectively comprise a square, triangle, octagon, and oval, although any other form of convex shape could also be used either singly or in combination therewith, as would be recognized by one skilled in the art.

Where each cluster 213-216 is not in the shape of a circle, a segment is measured in lieu of the radius. Each segment is measured from the center of mass 217-220 to a point along a span drawn between the centers of mass for each pair of clusters 213-216. The point is the point closest to each other cluster along the edge of each cluster. Each cluster 213-216 is reoriented along the vector such that the edges of each cluster 213-216 do not overlap.

While the invention has been particularly shown and described as referenced to the embodiments thereof, those skilled in the art will understand that the foregoing and other changes in form and detail may be made therein without departing from the spirit and scope of the invention.

What is claimed is:

1. A system for reorienting a cluster rendering within a display, comprising:
    a collection module to obtain a plurality of clusters that have been visually rendered on a two-dimensional display to model independent spatial orientations within multiple dimensions, wherein the clusters individually represent thematically related objects comprising a collection of documents;
    an evaluation module to evaluate the spatial orientations of the clusters in each such dimension by identifying two-dimensional relationships for pairs of the clusters;
    a search module to determine a distance for at least one such cluster from a common origin within the display that visually preserves the spatial orientation of the at least one cluster as a function of the relationships of that cluster, wherein the distance for the at least one such cluster is proportionately adjusted according to the relationships, and the adjustment is determined using a coefficient calculated according to the equation comprising:

$$k = \frac{d_{i(new)}}{d_{i(old)}}$$

where $d_{i(new)}$ represents the distance for the at least one such cluster from the common origin in the display that preserves the spatial orientation and $d_{i(old)}$ represents a fixed distance for the at least one such cluster from the common origin in the display prior to preserving the spatial orientation; and a central processing unit for executing said modules.

2. The system according to claim 1, further comprising:
    a clustering module to find a center and radii for each cluster and a fixed distance from the common origin to the center of the cluster.

3. The system according to claim 1, wherein the distance for the at least one such cluster minimizes visual overlap between the clusters in the display.

4. The system according to claim 1, wherein the display is selected from a group comprising a CRT display, LCD display, and printer.

5. A method for reorienting a cluster rendering within a display, comprising:
    obtaining a plurality of clusters that have been visually rendered on a two-dimensional display to model independent spatial orientations within multiple dimensions, wherein the clusters individually represent thematically related objects comprising a collection of documents;
    evaluating the spatial orientations of the clusters in each such dimension by identifying two-dimensional relationships for pairs of the clusters; and
    determining a distance for at least one such cluster from a common origin within the display that visually preserves the spatial orientation of the at least one cluster as a function of the relationships of that cluster, wherein the distance for the at least one such cluster is proportionately adjusted according to the relationships, and the adjustment is determined using a coefficient calculated according to the equation comprising:

$$k = \frac{d_{i(new)}}{d_{i(old)}}$$

where $d_{i(new)}$ represents the distance for the at least one such cluster from the common origin in the display that preserves the spatial orientation and $d_{i(old)}$ represents a fixed distance for the at least one such cluster from the common origin in the display prior to preserving the spatial orientation.

6. The method according to claim 5, further comprising:
    finding a center and radii for each cluster and a fixed distance from the common origin to the center of the cluster.

7. The method according to claim 5, wherein the distance for the at least one such cluster minimizes visual overlap between the clusters in the display.

8. The method according to claim 5, wherein the display is selected from a group comprising a CRT display, LCD display, and printer.

9. A computer-readable storage medium holding code for performing the method according to claim 5.

10. A system for providing a perspective-corrected representation of a multi-dimensional cluster, comprising:
- a display module to display clusters based on independent spatial orientations within multiple dimensions, where, for each such spatial orientation, the clusters are located at an independent distance from a common origin and the clusters individually represent thematically related objects comprising a collection of documents;
- an analysis module to pick and to analyze a relationship between a pair of the clusters, comprising;
  - a selection module to select a criteria for perspective correction; and
  - an application module to apply the criteria to the pair of clusters to determine whether the clusters need to be reoriented, wherein the independent distance for the at least one such cluster is proportionately adjusted according to the relationship, and the adjustment is determined using a coefficient calculated according to the equation comprising:

$$k = \frac{d_{i(new)}}{d_{i(old)}}$$

where $d_{i(new)}$ represents the independent distance for the at least one such cluster from the common origin in the display that preserves the spatial orientation and $d_{i(old)}$ represents a fixed distance for the at least one such cluster from the common origin in the display prior to Preserving the spatial orientation;
- a reorientation module to reorient the clusters in the display by a perspective-corrected distance based on the relationship between the pair of clusters; and a central processing unit for executing said modules.

11. The system according to claim 10, wherein the criteria comprises at least one of a common bounding region between the clusters and visual overlap of the clusters.

12. The system according to claim 10, wherein the perspective-corrected distance comprises a proportionate extension of the distance for the cluster determined by multiplying the independent distance of each cluster by a fixed coefficient.

13. A method for providing a perspective-corrected representation of a multi-dimensional cluster, comprising:
- displaying clusters based on independent spatial orientations within multiple dimensions, where, for each such spatial orientation, the clusters are located at an independent distance from a common origin and individually represent thematically related objects comprising a collection of documents;
- picking and analyzing a relationship between a pair of the clusters, comprising;
  - selecting a criteria for perspective correction; and
  - applying the criteria to the pair of clusters to determine whether the clusters need be reoriented, wherein the independent distance for the at least one such cluster is proportionately adjusted according to the relationships, and the adjustment is determined using a coefficient calculated according to the equation comprising:

$$k = \frac{d_{i(new)}}{d_{i(old)}}$$

where $d_{i(new)}$ represents the independent distance for the at least one such cluster from the common origin in the display that preserves the spatial orientation and $d_{i(old)}$ represents a fixed distance for the at least one such cluster from the common origin in the display prior to preserving the spatial orientation; and
- reorienting the clusters in the display by a perspective-corrected distance based on the relationship between the pair of clusters.

14. The method according to claim 13, wherein the criteria comprises at least one of a common bounding region between the clusters and visual overlap of the clusters.

15. The method according to claim 13, wherein the perspective-corrected distance comprises a proportionate extension of the distance for the cluster determined by multiplying the independent distance of each cluster by a fixed coefficient.

16. A computer-readable storage medium holding code for performing the method according to claim 13.

* * * * *